US009869765B2

(12) United States Patent
Kuo et al.

(10) Patent No.: US 9,869,765 B2
(45) Date of Patent: Jan. 16, 2018

(54) ALARM SYSTEM AND METHOD FOR VEHICLE

(71) Applicant: Wistron NeWeb Corporation, Hsinchu (TW)

(72) Inventors: Chi-Cheng Kuo, Hsinchu (TW); Hsin-Lung Hsiao, Hsinchu (TW); Tsai-Wang Chang, Hsinchu (TW); Min-Jung Wu, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 553 days.

(21) Appl. No.: 14/506,688

(22) Filed: Oct. 6, 2014

(65) Prior Publication Data

US 2015/0260841 A1 Sep. 17, 2015

(30) Foreign Application Priority Data

Mar. 14, 2014 (TW) .............................. 103109735 A

(51) Int. Cl.
| | |
|---|---|
| *G01S 13/93* | (2006.01) |
| *B60W 30/08* | (2012.01) |
| *G01S 13/34* | (2006.01) |
| *G01S 13/42* | (2006.01) |

(Continued)

(52) U.S. Cl.
CPC ............ *G01S 13/931* (2013.01); *B60W 30/08* (2013.01); *G01S 13/34* (2013.01); *G01S 13/341* (2013.01);

(Continued)

(58) Field of Classification Search
CPC .. B60W 30/00; B60W 30/08; B60W 30/0953; B60W 30/0965; B60W 2420/00;
(Continued)

(56) References Cited

U.S. PATENT DOCUMENTS 7,151,479 B2 * 12/2006 Beez ..................... G01S 7/4026
342/117
8,077,075 B2 * 12/2011 Randler ................ G01S 13/345
342/104

(Continued)

FOREIGN PATENT DOCUMENTS

| CN | 101676741 A | 3/2010 |
| CN | 102923000 A | 2/2013 |

(Continued)

*Primary Examiner* — Van Trieu
(74) *Attorney, Agent, or Firm* — Winston Hsu

(57) ABSTRACT

An alarm system for a vehicle comprises a sensor disposed on an installation plane of the vehicle, configured to emit a plurality of frequency-modulated continuous waveform (FMCW) signals toward a reverse plane of the installation plane and receiving reflected signals of the plurality of FMCW signals, to detect information of a plurality of targets within a specified range corresponding to the vehicle; an alarm being controlled to generate an alarm signal; and a control module coupled to the sensor and the alarm, capable of receiving the information of the plurality of targets detected by the sensor; determining a vehicle information of the vehicle in relation to an external environment according to the information of the plurality of targets; and determining movement statuses of the plurality of targets in relation to the vehicle according to the vehicle information and the information of the plurality of targets, and accordingly controlling the alarm.

20 Claims, 7 Drawing Sheets

(51) Int. Cl.
*G01S 13/50* (2006.01)
*G01S 13/58* (2006.01)

(52) U.S. Cl.
CPC .............. *G01S 13/42* (2013.01); *G01S 13/50* (2013.01); *G01S 13/589* (2013.01); *G01S 2013/9317* (2013.01); *G01S 2013/9332* (2013.01); *G01S 2013/9378* (2013.01); *G01S 2013/9385* (2013.01); *G01S 2013/9389* (2013.01)

(58) Field of Classification Search
CPC ......... B60W 2420/50; B60W 2420/52; B60W 2420/60; B60W 2420/90; B60W 2422/00; B60W 2422/95; B60W 2550/00; B60W 2550/12; B60W 2720/22; B60W 2750/00; B60W 2750/30; G01S 13/34; G01S 13/341; G01S 13/347; G01S 13/36; G01S 13/38; G01S 13/40; G01S 13/42; G01S 13/93; G01S 13/931
See application file for complete search history.

(56) References Cited

U.S. PATENT DOCUMENTS

| | | | | |
|---|---|---|---|---|
| 8,781,644 | B2* | 7/2014 | Samukawa | B60W 50/14 |
| | | | | 701/1 |
| 2004/0125010 | A1* | 7/2004 | Natsume | G01S 13/34 |
| | | | | 342/70 |
| 2011/0035093 | A1 | 2/2011 | Moench | |
| 2012/0271483 | A1* | 10/2012 | Samukawa | B60W 50/14 |
| | | | | 701/1 |
| 2014/0297171 | A1* | 10/2014 | Minemura | G08G 1/166 |
| | | | | 701/301 |

FOREIGN PATENT DOCUMENTS

| | | |
|---|---|---|
| CN | 102798863 B | 6/2014 |
| CN | 102741703 B | 7/2014 |
| TW | 201029867 | 8/2010 |
| TW | M466839 | 12/2013 |

\* cited by examiner

ALARM SYSTEM AND METHOD FOR VEHICLE

BACKGROUND OF THE INVENTION

1. Field of the Invention

The present invention relates to an alarm system and an alarm method for a vehicle, and more particularly, to an alarm system and an alarm method capable of detecting vehicle speed, simultaneously determining movement statuses of a plurality of targets, and accordingly controlling alarms.

2. Description of the Prior Art

According to the statistics, most of traffic accidents are related to drivers' distraction. If a driver is alerted at 0.5 seconds before being likely to have a collision, it can avoid at least 60% of rear-end collisions, 30% of head-on collisions and 50% of road ramp related traffic accidents. If alerted before 1 second, it can avoid 90% of traffic accidents. The statistics shows traffic accidents can be effectively reduced if the drives have enough reaction time. Vehicle alarm systems, e.g., a blind spot detection (BSD) system, a forward/rear collision warning system, are smart vehicle equipments developed for such needs. However, the vehicle alarm systems in the prior art have higher installation complexity, and adverse to aftermarket of vehicles, such that most equipments may not be applied to vehicles after leaving factories.

Take the BSD system as an example, the BSD system is a safety protection technique for vehicles, and utilizes a radar sensing technique of millimeter wave to achieve early warning. More specifically, the BSD system uses an image self-recognition method of machine vision, to detect obstacles in blind spot areas on left/right/front sides of a vehicle. If the BSD system detects that a specific obstacle exists in a blind spot area, the BSD system actively sends out a message of light or sound, for example, to a driver, so that the driver may change a driving direction accordingly, to avoid a traffic accident due to the driver's careless or blind side of vision.

Generally speaking, the BSD system deploys sensors in rear and/or front bumpers of a vehicle, emits millimeter wave radio signals, and receives corresponding reflecting signals, to determine whether there is an obstacle, such as another vehicle or a person, within a specific range. Additionally, in order to differentiate moving statuses of detecting targets to avoid erroneous determination or alarming, the BSD system requires vehicle related information such as velocity and angle deviation of the vehicle, to determine whether to start BSD or perform debugging. However, the vehicle related information is acquired from an electric control unit of the vehicle through a transmission line or wire. Under such a condition, connection of wires in the vehicle become more complex, especially for a modern smart vehicle, which is equipped with more and more functions and accessories (e.g., lane departure warning radar, reversing radar, anti-lock brake system, electric stable control system). Meanwhile, data robust is required during transmission, to avoid interferences from vehicle electric elements or environment noise. For example, ignition system, battery, wipers, electric windows, electric seats, air conditioner, radio, fuel supply system, clutch system, etc. can generate noise; or high-voltage, temperature/humidity changes of external environment may affect stability or accuracy of data transmission.

Moreover, data output from a vehicle electric control unit may not match a data specification of the BSD system, and it needs to transform the transmission data again, therefore delaying the data operation needed for real-time synchronization and causing time delays. Furthermore, if the BSD system targets for the aftermarket, meaning that the suppliers have no chance to involve decisions of disposition of radars, routing of transmission line, packet formats of the electric control unit, etc., how to develop staffs with installation techniques and to differentiate data packets and coding formats of various vehicles will be a great challenge.

Since vehicle alarm systems effectively reduce an incidence rate of traffic accident, if installation complexity and production costs of the vehicle alarm systems can be further reduced, and the vehicle alarm systems can be effectively applied in the aftermarket, an installation rate of the vehicle alarm systems will be raised, effectively reducing social costs induced by traffic accidents.

SUMMARY OF THE INVENTION

Therefore, it is a primary objective of the present invention to provide an alarm system and an alarm method for a vehicle, to improve the disadvantages of the prior art.

An embodiment of the present invention discloses an alarm system for a vehicle, comprising a sensor, disposed on an installation plane of the vehicle, configured to emit a plurality of frequency-modulated continuous waveform (FMCW) signals toward a reverse plane of the installation plane and receiving reflected signals of the plurality of FMCW signals, to detect information of a plurality of targets within a specified range corresponding to the vehicle; an alarm, being controlled to generate an alarm signal; and a control module, coupled to the sensor and the alarm, comprising a memory and a processor, the memory storing a program code instructing the processor to perform following steps: receiving the information of the plurality of targets detected by the sensor; determining a vehicle information of the vehicle in relation to an external environment according to the information of the plurality of targets; and determining movement statuses of the plurality of targets in relation to the vehicle according to the vehicle information and the information of the plurality of targets, and accordingly controlling the alarm.

An embodiment of the present invention further discloses an alarm method for a vehicle, the vehicle comprising a sensor and an alarm, a sensor disposed on an installation plane of the vehicle, configured to emit a plurality of FMCW signals toward a reverse plane of the installation plane and receiving reflected signals of the plurality of FMCW signals, to detect information of a plurality of targets within a specified range corresponding to the vehicle, the alarm method comprising receiving the information of the plurality of targets detected by the sensor; determining a vehicle information of the vehicle in relation to an external environment according to the information of the plurality of targets; and determining movement statuses of the plurality of targets in relation to the vehicle according to the vehicle information and the information of the plurality of targets, and accordingly controlling the alarm.

These and other objectives of the present invention will no doubt become obvious to those of ordinary skill in the art after reading the following detailed description of the preferred embodiment that is illustrated in the various figures and drawings.

DETAILED DESCRIPTION

For reducing installation complexity of a vehicle alarm system, the present invention does not have to rely on an electric control unit of the vehicle, but utilizes the vehicle alarm system to detect a vehicle speed, and to determine moving statuses of multiple targets. In such a situation, the present invention lessens costs of line material and developing or training for staffs, to reduce the installation complexity and production costs of the vehicle alarm systems.

Figure 1A:
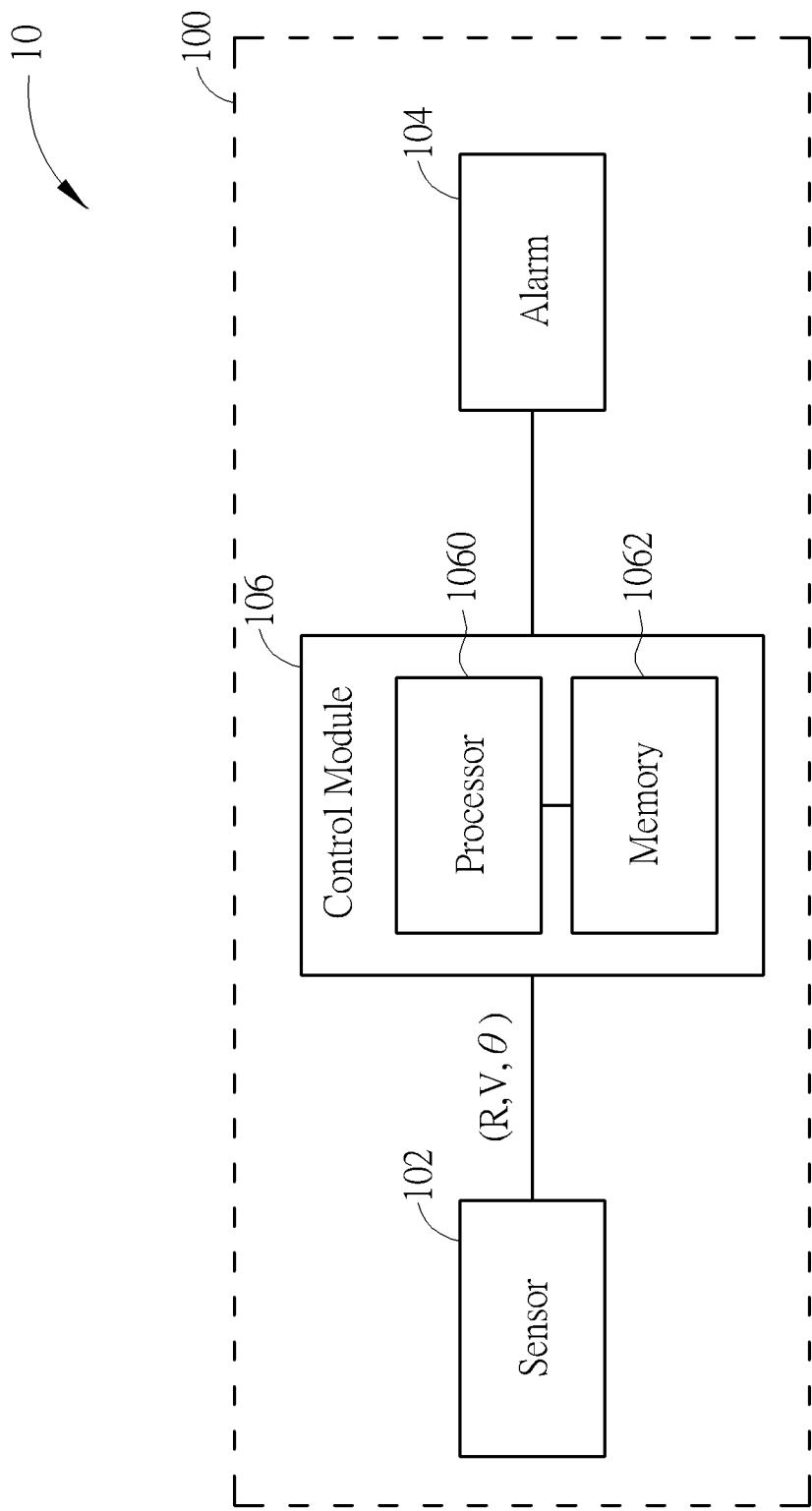
FIG. 1A is a functional block diagram of an alarm system according to an embodiment of the invention.
Figure 1B:
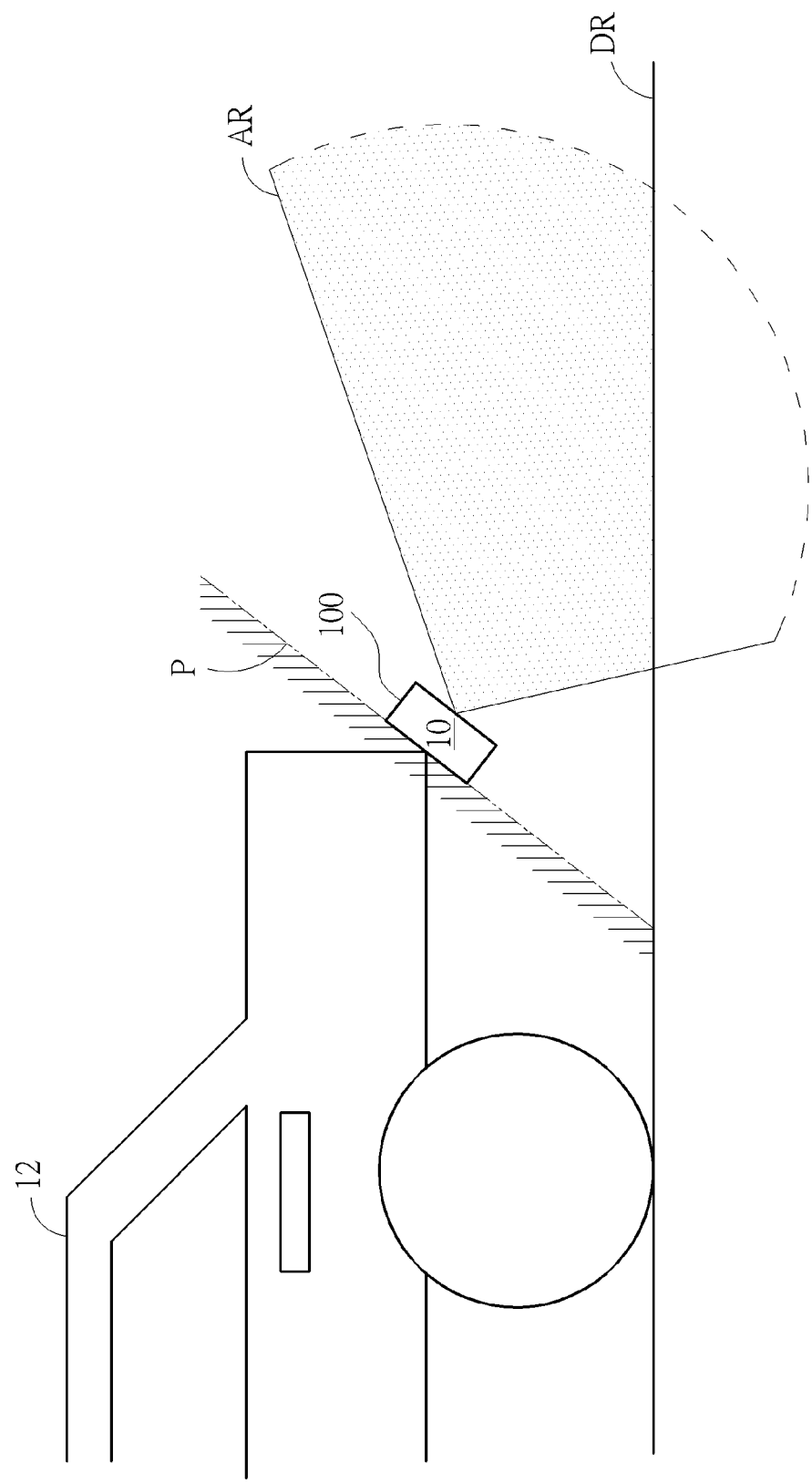
FIG. 1B is a schematic diagram of an installation of the alarm system in FIG. 1A.

Please refer to FIGS. 1A and 1B. FIG. 1A is a functional block diagram of an alarm system 10 according to an embodiment of the invention. FIG. 1B is a schematic diagram of an installation of the alarm system 10. The alarm system 10 is installed on a vehicle such as a car, a bus, a truck, etc., for detecting whether an obstacle, such as another vehicle or a person, is within a specific range, and sending out an alarm signal accordingly, to avoid drivers causing traffic accidents because of carelessness, or blind spots, etc. The alarm system 10 comprises a housing 100, a sensor 102, an alarm 104 and a control module 106, and is disposed on a rear of a vehicle 12. The housing 100 is for covering the sensor 102, the alarm 104 and the control module 106, which may be either a standalone housing, or be a part of the vehicle 12 (like a bumper), as long as the sensor 102 is stably installed on an installation plane P and performs sensing toward a reverse plane of the installation plane P. In such a configuration, the sensor 102 is configured to emit frequency-modulated continuous waveform (FMCW) signals toward the reverse plane of the installation plane P and receive reflected signals of the FMCW signals, so as to detect information such as distances R, relative speeds V, angles θ, etc., of targets in relation to the sensor 102 within a specified range AR in relation to the vehicle 12. Moreover, as shown in FIG. 1B, the range AR partially covers a driving plane DR of the vehicle 12. In other words, results sensed by the sensor 102 comprise information of targets on the driving plane DR. The control module 106 comprises a processor 1060 and a memory 1062. The memory 1062 stores a program code, to instruct the processor 1060 to compute a vehicle information of the vehicle 12 in relation to an external environment according to the sensing results of the sensor 102, determine movement statuses of the targets in relation to the vehicle 12, and control the alarm 104 accordingly to generate an alarm signal adequately.

In detail, the sensor 102 comprises transmission antennas and reception antennas of FMCW, and utilizes difference frequencies between reflected signals and emitted signals along with phase information to detect targets and distances thereof. Utilizing FMCW to sense targets is known by those skilled in the art, which is briefly narrated as follows. A transmitting module of the sensor 102 utilizes a sweep controller to control a local oscillator to generate FMCW signals or other extensions of FMCW signals, and emits the FMCW signals toward the range AR through the transmission antennas. After the reception antennas of the sensor 102 receive signals reflected from the targets, the sensor 102 processes the received signals through a mixer with a sinusoidal signal generated by the local oscillator and a low pass filter, and obtains beat frequency signals between these two. The beat frequency signals are converted into digital signals via an analog to digital converter, to compute information of the targets in relation to the sensor 102, e.g., the distances R, the relative speeds V and the angles θ through digital signal processing techniques.

Since the sensing results of the sensor 102 (i.e. information of the targets within the range AR) comprises information of the targets on the driving plane DR, the control module 106 may obtain a relative speed of the vehicle 12 in relation to the driving plane DR, and determine the moving statuses of the targets accordingly, to avoid erroneous determination or alarming. In such a situation, the alarm system 10 of the embodiment of the present invention does not have to rely on an electric control unit of the vehicle, but utilizes the sensor 102 to determine a relative speed of the vehicle 12, such that the cost of line material and requirements for developing or training staffs are lessened, so as to reduce the installation complexity and the production costs of the alarm system 10.

Figure 2:
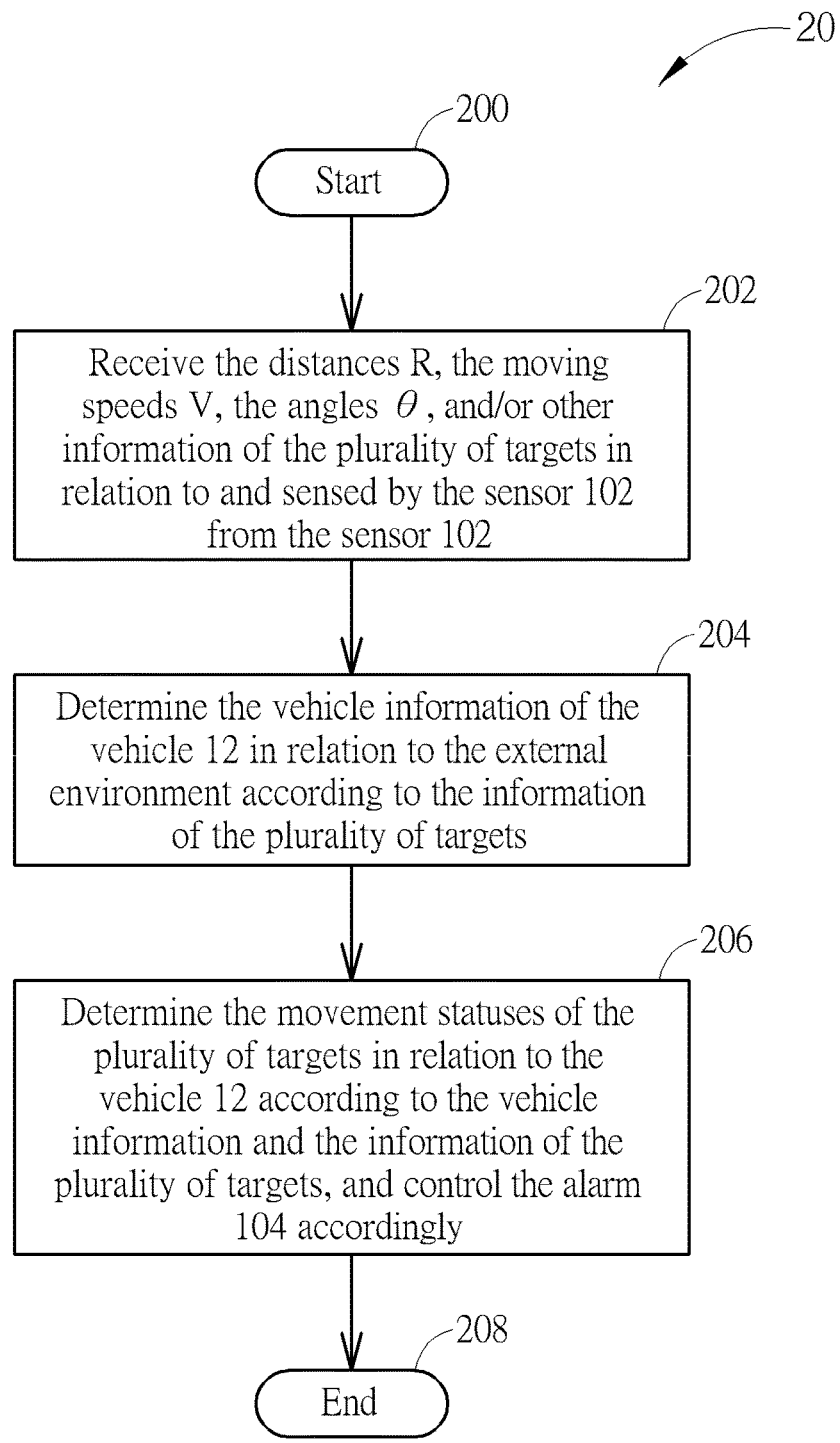
FIG. 2 is a schematic diagram of an alarm process according to an embodiment of the invention.

The method of the control module 106 can be further summarized as an alarm process 20, as shown in FIG. 2. The alarm process 20 may be compiled as programming codes stored in the memory 1062 and executed by the processor 1060. The alarm process 20 comprises following steps:

Step 200: Start.

Step 202: Receive the distances R, the relative speeds V, the angles θ, and/or other information of the plurality of targets in relation to and sensed by the sensor 102 from the sensor 102.

Step 204: Determine the vehicle information of the vehicle 12 in relation to the external environment according to the information of the plurality of targets.

Step 206: Determine the movement statuses of the plurality of targets in relation to the vehicle 12 according to the vehicle information and the information of the plurality of targets, and control the alarm 104 accordingly.

Step 208: End.

Therefore, when the control module 106 receives the information of the targets sensed by the sensor 102, since the sensing results of the sensor 102 comprise information of the targets on the driving plane DR, the control module 106 may determine the vehicle information of the vehicle 12 in relation to the external environment, i.e., the relative speed of the vehicle 12 in relation to the driving plane DR. Thereby, the control module 106 determines the moving statuses of the targets, and avoids erroneous determination or alarm, to control the alarm 104 adequately.

Figure 3:
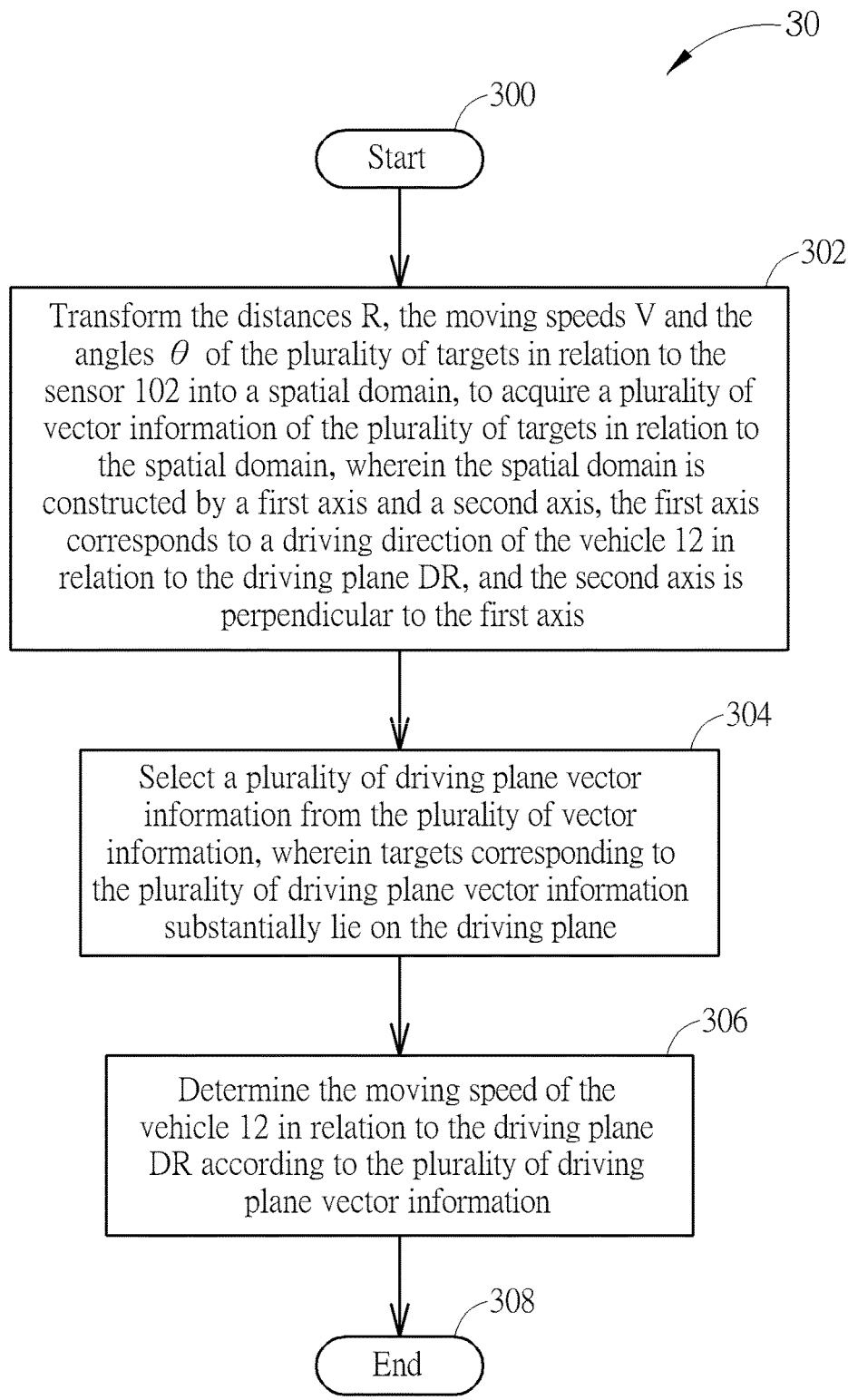
FIG. 3 is a schematic diagram of a vehicle speed determining process according to an embodiment of the invention.

The method of the control module 106 determining the relative speed of the vehicle 12 in relation to the driving plane DR (i.e., Step 204) can be referred to FIG. 3, which is a schematic diagram of a vehicle speed determining process 30 according to an embodiment of the present invention. The vehicle speed determining process 30 may be compiled as programming codes stored in the memory 1062 and executed by the processor 1060. The vehicle speed determining process 30 comprises following steps:

Step 300: Start.

Step 302: Transform the distances R, the relative speeds V and the angles θ of the plurality of targets in relation to the sensor 102 into a spatial domain, to acquire a plurality of vector information of the plurality of targets in relation to the spatial domain, wherein the spatial domain is constructed by a first axis and a second axis, the first axis corresponds to a driving direction of the vehicle 12 in relation to the driving plane DR, and the second axis is perpendicular to the first axis.

Step 304: Select a plurality of driving plane vector information from the plurality of vector information, wherein targets corresponding to the plurality of driving plane vector information substantially lie on the driving plane.

Step 306: Determine the relative speed of the vehicle 12 in relation to the driving plane DR according to the plurality of driving plane vector information.

Step 308: End.

Figure 4:
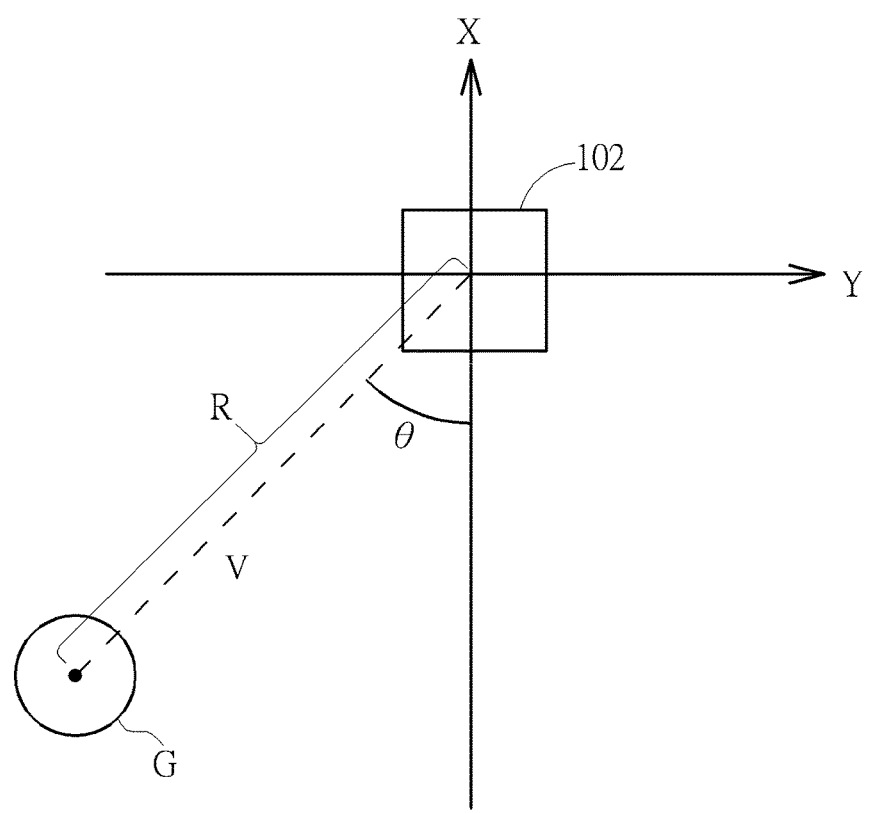
FIG. 4 is a schematic diagram of a coordinate relationship between a sensor of the alarm system shown in FIG. 1A and a target.

According to the vehicle speed determining process 30, the control module 106 performs coordinate transformation to convert the distances R, the relative speeds V and the angles θ of the targets into the spatial domain, and acquires the corresponding vector information. Please refer to FIG. 4, which is a schematic diagram of a coordinate relationship between the sensor 102 and a target G, where an X axis, i.e., the first axis, represents the driving direction of the vehicle 12 in relation to the driving plane DR, and Y axis, i.e., the second axis, is perpendicular to the X axis. As can be seen from FIG. 4, a position $(x_G, y_G)$ of the target G on the X axis and the Y axis can be represented as:

$$x_G = R\cos(\theta)$$

$$y_G = R\sin(\theta)$$

Similarly, velocity components $(v_{x,G}, v_{y,G})$ of the target G on the X axis and the Y axis can be represented as:

$$v_{x,G} = v_r \cos(\theta)$$

$$v_{y,G} = v_r \sin(\theta)$$

where $[x_G, y_G, v_{x,G}, v_{y,G}]$ is the vector information of the target G.

Similar to this rationale, assume that at a time instant t the sensor 102 senses M reflection points, of which the distances R, the relative speeds V and the angles θ are:

$$R_t = [R_{t,0}, R_{t,1}, \ldots R_{t,M-1}]$$

$$V_t = [V_{t,0}, V_{t,1}, \ldots V_{t,M-1}]$$

$$\theta_t = [\theta_{t,0}, \theta_{t,1}, \ldots \theta_{t,M-1}]$$

According to the representation stated above, the vector information of each target can be represented as $[x_{t,m}, y_{t,m}, v_{x,t,m}, v_{y,t,m}]$ where $$x_{t,m} = R_{t,m}\cos(\theta_{t,m}) \epsilon m = 0,1,\ldots,M-1$$

$$y_{t,m} = R_{t,m}\sin(\theta_{t,m}) \epsilon m = 0,1,\ldots,M-1$$

$$v_{x,t,m} = v_{r,t}\cos(\theta_{t,m}) \epsilon m = 0,1,\ldots,M-1$$

$$v_{y,t,m} = v_{r,t}\sin(\theta_{t,m}) \epsilon m = 0,1,\ldots,M-1.$$

Figure 5A:
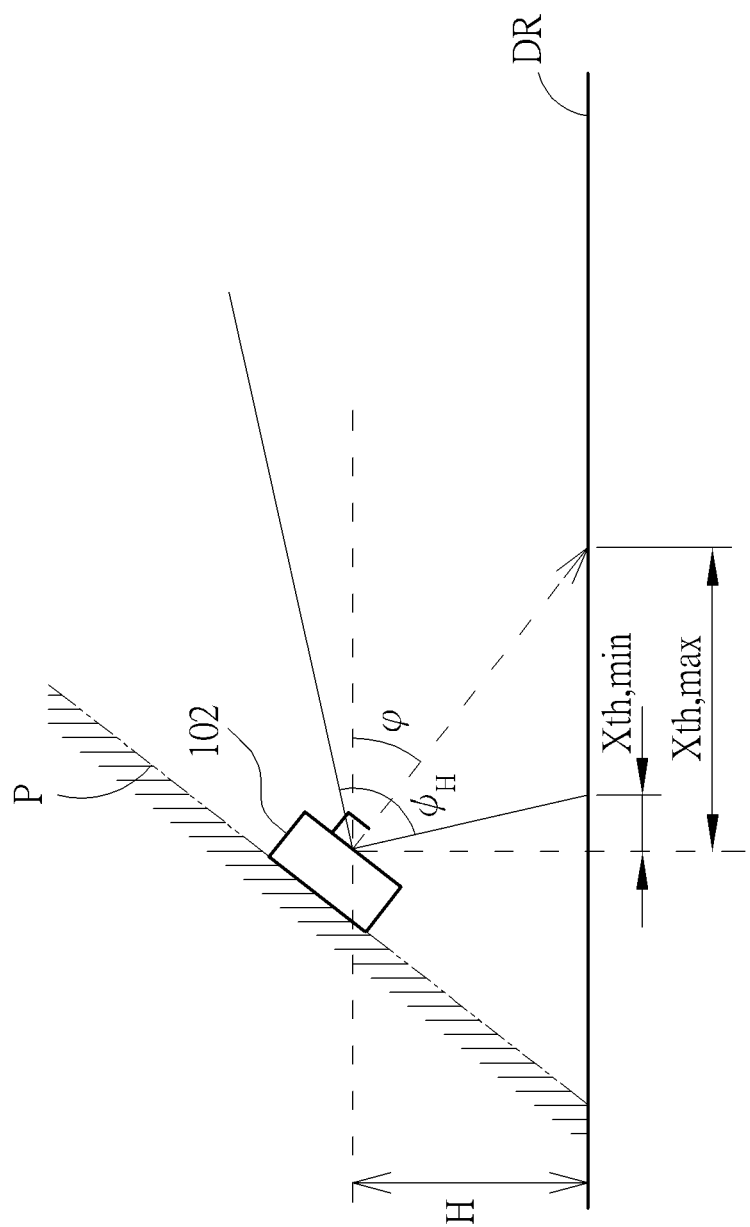
FIGS. 5A, 5B are schematic diagrams of a side view and a vertical view of the sensor of the alarm system in FIG. 1A in relation to a vehicle.
Figure 5B:
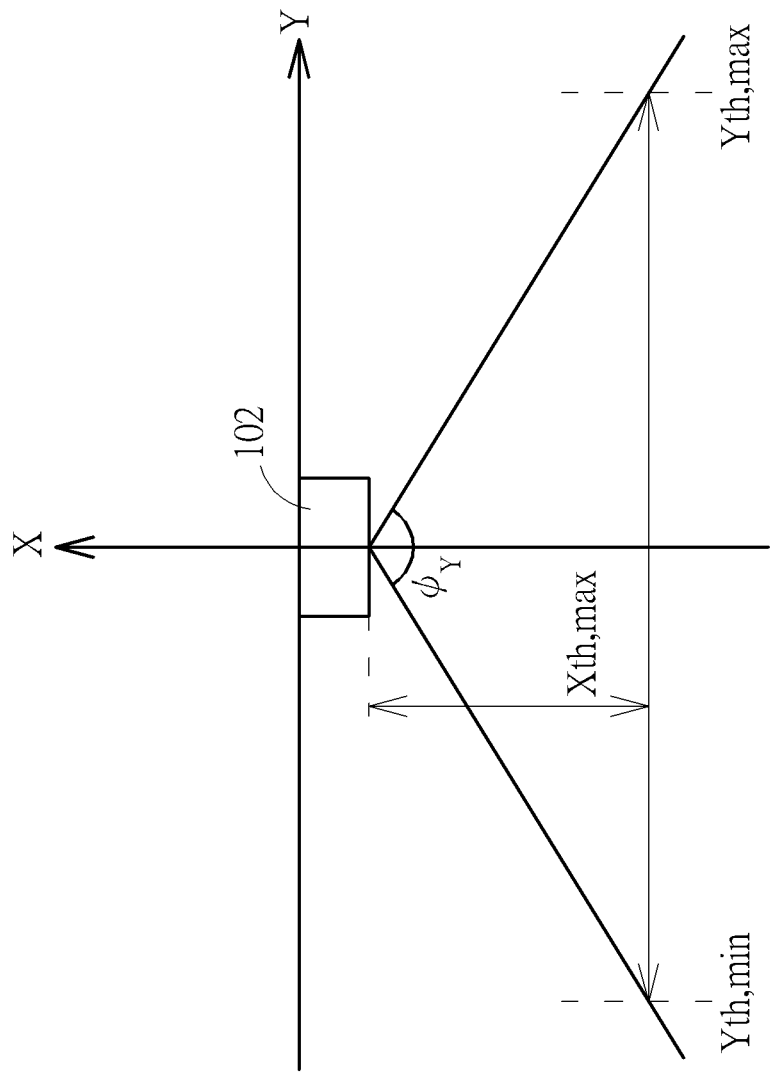

After obtaining the vector information of all the targets, according to Step 304, the control module 106 performs a position review, to select the driving plane vector information, i.e., vector information corresponding to targets substantially lying on the driving plane DR. In order to determine the driving plane vector information, the embodiment may consider a height H of the sensor 102 in relation to the driving plane DR and a detecting range of the sensor 102 to determine the vector information corresponding to the targets substantially lying on the driving plane DR as the driving plane vector information. In detail, please refer to FIGS. 5A and 5B. FIG. 5A is a schematic diagram of a side view of the sensor 102 in relation to the vehicle 12 (i.e., a detailed diagram of FIG. 1B). FIG. 5B is a schematic diagram of a vertical view of the sensor 102. Assume that H is a height of the installed position of the sensor 102 in relation to the driving plane DR, φ is an installation angle (i.e., an angle between the installation plane P and a vertical direction, equal to an angle between a normal line of the sensor 102 and a horizontal plane), $\varphi_H$ is a vertical coverage angle of the detecting range of the sensor 102, and $\varphi_Y$ is a horizontal coverage angle of the detecting range of the sensor 102. In such a situation, the driving plane vector information should satisfy:

$$X_{th,min} < x_{t,m} < X_{th,max};$$

$$Y_{th,min} < y_{t,m} < Y_{th,max},$$

where $X_{th,min} = H \times \cot(\varphi + \varphi_H/2)$ represents the smallest X-axis distance satisfying the driving plane vector information;

$X_{th,max} = H \times \cot(\varphi)$ represents the greatest X-axis distance satisfying the driving plane vector information;

$Y_{th,min} = X_{th,max} \times \tan(\varphi_Y/2)$ represents the smallest Y-axis distance satisfying the driving plane vector information; and $Y_{th,max} X_{th,max} \times \tan(\varphi_Y/2)$, representing the greatest Y-axis distance satisfying the driving plane vector information.

Through the position review process, the vector information of the targets substantially lying on the driving plane DR are obtained, i.e., the driving plane vector information in Step 304. In such a situation, the control module 106 may average the velocity components $V_x$ of the X axis over all the driving plane vector information, and obtains a departing speed of the driving plane DR in relation to the vehicle 12, to obtain the relative speed of the vehicle 12 in relation to the driving plane DR (opposite to the departing speed).

Note that, when the vehicle is moving in a practical roadway, the targets on the driving plane DR may include targets moving in an opposite direction, targets moving in the same direction with slower speeds, fences and islands beside the roadway, etc. Even these targets are departing from the vehicle 12 when the vehicle 12 is moving, they might be counted as the driving plane vector information. If these targets are included to compute the relative speed, an accuracy of the estimated speed will be degraded dramatically. In such a situation, the control module 106 may further select or determine reference vector information from the driving plane vector information. The so-called reference vector information means that the corresponding targets are departing from the vehicle 12 with substantially the same departing speeds. Hence, the control module 106 computes the relative speed of the vehicle 12 in relation to the driving plane DR according to the departing speeds in relation to the vehicle 12 indicated by all the reference vector information, such that the accuracy is enhanced.

For example, assuming T is a sensing period of the sensor 102, under a normal driving condition of the vehicle 12, a velocity difference Δv between two consecutive periods would be limited by a threshold value $V_{th}$ due to an acceleration and deceleration capability of the vehicle, where $\Delta v = |v_T - v_{T-1}|$, and $v_T$ and $v_{T-1}$ are actual vehicle speeds at time T and (T−1), respectively. On the other hand, since real ground targets keep existing, other reflectors, which are unreal ground targets but satisfy the driving plane vector information, would enter the detecting range (i.e., AR) of the sensor 102 at some time instance and leave the detecting range after a certain period. Hence, the real ground targets may be determined by determining whether the velocity component $V_x$ on the X axis satisfies:

$$|v_{x,T,m} - \hat{v}_{T-1}| < V_{th};$$

where $\hat{v}_{T-1}$ is an estimated vehicle speed at time instance (T−1), and $V_{th}$ is the threshold value of the velocity difference. If the condition is satisfied, the corresponding target is determined to be a real ground target, which satisfies the reference vector information. As a result, targets suddenly entering the detecting range of the sensor 102 can be filtered out. Finally, after averaging the velocity components $V_x$ of the X axis over all the reference vector information, interference from the unreal ground targets is excluded, the departing speed of the driving plane DR in relation to the vehicle 12 is more accurately obtained, and the relative speed of the vehicle 12 in relation to the driving plane DR (opposite to the departing speed) is further obtained. In other words, if there are K reference vector information (i.e., K targets are real ground targets), represented as [$x_{t,k}$, $y_{t,k}$, $v_{x,t,k}$, $v_{y,t,k}$], for k=0, 1, . . . , K−1, after the position review and the velocity review, a velocity estimate value $\hat{v}_{temp,t}$ at time instant t can be acquired by averaging the velocity components $V_x$ of the X axis at time instant t, which is:

$$\hat{v}_{temp,t} = \sum_{k=0}^{K-1} v_{x,t,k} / K.$$

The value $\hat{v}_{temp,t}$ is the departing speed of the driving plane DR in relation to the vehicle 12, and a negative value of the departing speed is the relative speed of the vehicle 12 in relation to the driving plane DR.

In addition, the driving plane DR is not completely horizontal in practice. In other words, the sensor 102 may sense no ground target or large errors may occur in the sensing results, causing the speed computed by the control module 106 being discontinuous and having a large variation. In such a situation, in order to deal with affections on performance of sensing and tracing targets caused by sudden errors, the control module 106 may further perform a smoothen filtering on the relative speed of the vehicle 12. For example, continuing from the result of the velocity estimate value $\hat{v}_{temp,t}$ stated above, the control module 106 may employ an Nth order finite impulse response filtering to perform a smoothen filtering on the velocity estimate value $\hat{v}_{temp,t}$, and obtain:

$$\hat{v}_t = \sum_{n=2}^{N} a_n \hat{v}_{t-n} + a_1 \hat{v}_{temp,t}.$$

Hence, the obtained estimate speed $\hat{v}_t$ becomes smoother in response to time variation, not affected by sudden error, approaching the actual vehicle speed.

As can be seen form the above, the embodiments of the present invention utilizes the coordinate transformation, the position review and the velocity review, excludes the unreal ground targets, and further performs the velocity averaging and the smoothen filtering, to obtain the more accurate vehicle speed. In such a situation, the alarm system 10 of the embodiments of the present invention does not have to rely on the electric control unit of the vehicle, but utilizes the sensor 102 to determine the relative speed of the vehicle 12, and simultaneously determines the moving statuses of the targets, avoiding erroneous determination or alarming.

Therefore, the embodiments of the present invention may effectively lessen the costs of line material and developing or training for staffs, to reduce the installation complexity and the production costs of the alarm system 10.

Notably, the alarm system 10 in FIG. 1A is an embodiment of the present invention, those skilled in the art may make modifications and alternations accordingly, and not limited herein. For example, the processor 1060 of the control module 106 may be a microprocessor or an application-specific integrated circuit (ASIC). The memory 1062 may be any storage device, such as read-only memory (ROM), random-access memory (RAM), CD-ROMs, magnetic tapes, floppy disks, optical data storage devices, etc., and are not limited herein. In addition, the alarm process 20 and the vehicle speed determining process 30 are represented in step by step manner. In fact, the alarm process 20 and the vehicle speed determining process 30 can be implemented by multiple algorithms, or executed by different processors, which is also under the scope of the present invention.

Furthermore, in addition to applying the alarm system 10 of the embodiments of the present invention to the BSD system, the alarm system 10 may be applied in the forward/rear collision warning system, as long as properly adjusting the installed position of the sensor 102 and conditions for the control module 106 to start the alarm 104.

For example, if the alarm system 10 is implemented in the BSD system, the sensor 102 should be disposed on a rear or a side of the vehicle. As mentioned in the above, the detecting range AR should partially cover the driving plane DR and partially cover a blind spot area, e.g., the sensor 102 may be disposed on two sides of a rear bumper, or on two side mirrors. Meanwhile, the control module 106 should control the alarm 104 to generate the alarm signal when determining that at least a target lies in the range AR and the vehicle 12 is going to move toward a direction of the range AR in relation to the vehicle 12. In other words, if the sensor 102 is used for sensing a blind spot area at a rear right side of the vehicle 12, when the control module 106 determines targets in this blind spot area and the vehicle 12 is moving toward right, the control module 106 controls the alarm 104 to generate the alarm signal.

Furthermore, if the alarm system 10 is implemented in a forward collision warning system, the sensor 102 should be disposed on a front part of the vehicle. As mentioned in the above, the detecting range AR should partially cover the driving plane DR and partially cover front areas of the vehicle, e.g., the sensor 102 may be disposed on a center of a front bumper. Meanwhile, the control module 106 should control the alarm 104 to generate the alarm signal when determining that at least a target lies in the range AR and the vehicle 12 is going to move toward the target within the range AR. In other words, if the sensor 102 is used for sensing obstacles in front of the vehicle 12, when the control module 106 determines that a target exists in front of the vehicle 12 and the vehicle 12 is moving toward the target, or the relative speed is greater than a predefined value, then the control module 106 controls the alarm 104 to generate the alarm signal.

In another perspective, if the alarm system 10 is implemented in a rear collision warning system, the sensor 102 should be disposed on a rear part of the vehicle. As mentioned in the above, the detecting range AR should partially cover the driving plane DR and partially cover rear areas of the vehicle, e.g., the sensor 102 may be disposed on a center of a rear bumper. Meanwhile, the control module 106 should control the alarm 104 to generate the alarm signal when determining that at least a target within the range AR moves toward the vehicle 12 with a speed greater than a threshold value. In other words, if the sensor 102 is used for sensing obstacles in rear of the vehicle 12, when the control module 106 determines a target exists in rear of the vehicle 12 and fast moves toward the vehicle 12, then the control module 106 controls the alarm 104 to generate the alarm signal.

The embodiments of the alarm system 10, applied in the BSD system and the forward/rear collision warning system described above, are only for illustrative purpose. Those skilled in the art may adequately modified operation principles of the control module 106 controlling the alarm 104 according to system requirements.

In summary, the vehicle alarm systems in the prior art relies on the electric control unit of the vehicle to obtain the vehicle information, which complicates the connection of wires in the vehicle, and raises the installation complexity and the production costs of the vehicle alarm systems. Meanwhile, the data output from the vehicle electric control unit may not match the data specification of the vehicle alarm systems, and it needs to transform the transmission data again, therefore delaying the data operation needed for real-time synchronization and causing time delays. In comparison, the present invention does not have to rely on the electric control unit of the vehicle, but utilizes the vehicle alarm systems to determine the relative speed of the vehicle, and simultaneously determines the moving statuses of multiple targets. In such a situation, the present invention lessens the cost of line material and developing or training for staffs, not only to reduce the installation complexity and the production costs in the before market, but also to be effectively applied in the aftermarket, raising the installation rate of the vehicle alarm systems, therefore effectively reducing social costs induced by traffic accidents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An alarm system, for a vehicle, comprising:
    a sensor, disposed on an installation plane of the vehicle, configured to emit a plurality of frequency-modulated continuous waveform (FMCW) signals toward a reverse plane of the installation plane and receiving reflected signals of the plurality of FMCW signals, to detect information of a plurality of targets within a specified range corresponding to the vehicle;
    an alarm, being controlled to generate an alarm signal; and
    a control module, coupled to the sensor and the alarm, comprising a memory and a processor, the memory storing a program code instructing the processor to perform following steps:
        receiving the information of the plurality of targets detected by the sensor;
        determining a vehicle information of the vehicle in relation to an external environment according to the information of the plurality of targets;
        selecting a plurality of first targets from the plurality of targets according to the information of the plurality of targets, and obtaining a plurality of driving plane vector information corresponding to the plurality of first targets from the information of the plurality of targets, wherein positions of the plurality of first targets are within a first range; and
        determining movement statuses of the plurality of targets in relation to the vehicle according to the vehicle information and the information of the plurality of targets, and accordingly controlling the alarm.

2. The alarm system of claim 1, wherein the information of the plurality of targets comprises distances, relative speeds and angles of the plurality of targets in relation to the sensor, and the vehicle information of the vehicle in relation to the external environment is a relative speed of the vehicle in relation to a driving plane.

3. The alarm system of claim 2, wherein the step of selecting the plurality of first targets from the plurality of targets according to the information of the plurality of targets and obtaining the plurality of driving plane vector information corresponding to the plurality of first targets comprises:
    transforming the distances, the relative speeds and the angles of the plurality of targets in relation to the sensor into a spatial domain, to acquire a plurality of vector information of the plurality of targets in relation to the spatial domain, wherein the spatial domain is constructed by a first axis and a second axis, the first axis corresponds to a driving direction of the vehicle in relation to the driving plane, and the second axis is perpendicular to the first axis;
    selecting the plurality of driving plane vector information from the plurality of vector information, wherein the plurality of driving plane vector information correspond to the plurality of first targets, and the plurality of first targets are within the first range on the driving plane; and
    determining the relative speed of the vehicle in relation to the driving plane according to the plurality of driving plane vector information.

4. The alarm system of claim 3, wherein the step of selecting the plurality of driving plane vector information from the plurality of vector information comprises:
    determining vector information of the plurality of vector information, of which corresponding targets substantially lie on the driving plane, as the plurality of driving plane vector information according to a height of the sensor in relation to the driving plane and a detecting range of the sensor.

5. The alarm system of claim 3, wherein the step of determining the relative speed of the vehicle in relation to the driving plane according to the plurality of driving plane vector information comprises:
    selecting a plurality of reference vector information from the plurality of driving plane vector information, wherein the plurality of reference vector information correspond to a plurality of second targets of the plurality of targets, and velocities of the plurality of second targets in related to the vehicle is within a second range; and
    computing the relative speed of the vehicle in relation to the driving plane according to the departing speeds in relation to the vehicle indicated by the plurality of reference vector information.

6. The alarm system of claim 5, wherein the step of computing the relative speed of the vehicle in relation to the driving plane according to the departing speeds in relation to the vehicle indicated by the plurality of reference vector information is averaging the departing speeds in relation to the vehicle indicated by the plurality of reference vector information, to compute the relative speed of the vehicle in relation to the driving plane.

7. The alarm system of claim 5, wherein the step of computing the relative speed of the vehicle in relation to the driving plane according to the departing speeds in relation to the vehicle indicated by the plurality of reference vector information further comprises performing a smoothen filtering on the computed relative speed.

8. The alarm system of claim 1, wherein the step of determining the movement statuses of the plurality of targets in relation to the vehicle according to the vehicle information and the information of the plurality of targets, and accordingly controlling the alarm comprises:
controlling the alarm to generate the alarm signal when determining that at least a target of the plurality of targets lie in the specified range and the vehicle is going to move toward a direction of the specified range in relation to the vehicle; or
controlling the alarm to generate the alarm signal when determining that at least a target of the plurality of targets lie in the specified range and the vehicle is going to move toward the at least a target in the specified range; or
controlling the alarm to generate the alarm signal when determining that at least a target of the plurality of targets moves toward the vehicle with a speed greater than a threshold value.

9. The alarm system of claim 1, wherein the first range is related to an installation angle corresponding to the installation plane.

10. The alarm system of claim 9, wherein the installation angle is an angle between a normal line of the sensor and a horizontal plane.

11. An alarm method, for a vehicle, the vehicle comprising a sensor and an alarm, a sensor disposed on an installation plane of the vehicle, configured to emit a plurality of frequency-modulated continuous waveform (FMCW) signals toward a reverse plane of the installation plane and receiving reflected signals of the plurality of FMCW signals, to detect information of a plurality of targets within a specified range corresponding to the vehicle, the alarm method comprising:
receiving the information of the plurality of targets detected by the sensor;
determining a vehicle information of the vehicle in relation to an external environment according to the information of the plurality of targets;
selecting a plurality of first targets from the plurality of targets according to the information of the plurality of targets, and obtaining a plurality of driving plane vector information corresponding to the plurality of first targets from the information of the plurality of targets, wherein positions of the plurality of first targets are within a first range; and
determining movement statuses of the plurality of targets in relation to the vehicle according to the vehicle information and the information of the plurality of targets, and accordingly controlling the alarm.

12. The alarm method of claim 11, wherein the information of the plurality of targets comprises distances, relative speeds and angles of the plurality of targets in relation to the sensor, and the vehicle information of the vehicle in relation to the external environment is a relative speed of the vehicle in relation to a driving plane.

13. The alarm method of claim 12, wherein the step of selecting the plurality of first targets from the plurality of targets according to the information of the plurality of targets and obtaining the plurality of driving plane vector information corresponding to the plurality of first targets comprises:
transforming the distances, the relative speeds and the angles of the plurality of targets in relation to the sensor into a spatial domain, to acquire a plurality of vector information of the plurality of targets in relation to the spatial domain, wherein the spatial domain is constructed by a first axis and a second axis, the first axis corresponds to a driving direction of the vehicle in relation to the driving plane, and the second axis is perpendicular to the first axis;
selecting the plurality of driving plane vector information from the plurality of vector information, wherein to the plurality of driving plane vector information correspond to the plurality of first targets, and the plurality of first targets are within the first range on the driving plane; and
determining the relative speed of the vehicle in relation to the driving plane according to the plurality of driving plane vector information.

14. The alarm method of claim 13, wherein the step of selecting the plurality of driving plane vector information from the plurality of vector information comprises:
determining vector information of the plurality of vector information, of which corresponding targets substantially lie on the driving plane, as the plurality of driving plane vector information according to a height of the sensor in relation to the driving plane and a detecting range of the sensor.

15. The alarm method of claim 13, wherein the step of determining the relative speed of the vehicle in relation to the driving plane according to the plurality of driving plane vector information comprises:
selecting a plurality of reference vector information from the plurality of driving plane vector information, wherein the plurality of reference vector information correspond to a plurality of second targets of the plurality of targets, and velocities of the plurality of second targets in related to the vehicle is within a second range; and
computing the relative speed of the vehicle in relation to the driving plane according to the departing speeds in relation to the vehicle indicated by the plurality of reference vector information.

16. The alarm method of claim 15, wherein the step of computing the relative speed of the vehicle in relation to the driving plane according to the departing speeds in relation to the vehicle indicated by the plurality of reference vector information is averaging the departing speeds in relation to the vehicle indicated by the plurality of reference vector information, to compute the relative speed of the vehicle in relation to the driving plane.

17. The alarm method of claim 15, wherein the step of computing the relative speed of the vehicle in relation to the driving plane according to the departing speeds in relation to the vehicle indicated by the plurality of reference vector information further comprises performing a smoothen filtering on the computed relative speed.

18. The alarm method of claim 11, wherein the step of determining the movement statuses of the plurality of targets in relation to the vehicle according to the vehicle information and the information of the plurality of targets, and accordingly controlling the alarm comprises:
controlling the alarm to generate the alarm signal when determining that at least a target of the plurality of targets lie in the specified range and the vehicle is going to move toward a direction of the specified range is in relation to the vehicle; or controlling the alarm to generate the alarm signal when determining that at least a target of the plurality of targets lie in the specified range and the vehicle is going to move toward the at least a target in the specified range; or controlling the alarm to generate the alarm signal when determining that at least a target of the plurality of targets moves toward the vehicle with a speed greater than a threshold value.

19. The alarm method of claim 11, wherein the first range is related to an installation angle corresponding to the installation plane.

20. The alarm method of claim 19, wherein the installation angle is an angle between a normal line of the sensor and a horizontal plane.

* * * * *